United States Patent

Payne et al.

[11] 4,003,724
[45] Jan. 18, 1977

[54] FOAM SCRUBBER AND METHOD

[75] Inventors: Thomas F. Payne; Philip D. Sauer, both of Flathead, Mont.

[73] Assignee: The Anaconda Company, New York, N.Y.

[22] Filed: Sept. 19, 1974

[21] Appl. No.: 507,375

[52] U.S. Cl. .................................. 55/87; 55/89; 55/228; 55/270; 55/421; 55/DIG. 34; 137/170.2
[51] Int. Cl.² ................................. B01D 47/04
[58] Field of Search ............. 55/87, 21, 160, 161, 55/163, 164, 178, 227, 228, 229, 270, 421, DIG. 34, 89, 18; 137/12, 170.2; 73/60.1, 299

[56] References Cited

UNITED STATES PATENTS

| | | | |
|---|---|---|---|
| 1,921,725 | 8/1933 | Boutet | 55/164 X |
| 2,119,478 | 5/1938 | Whiton, Jr. | 209/144 |
| 2,379,338 | 6/1945 | Bingman | 55/178 X |
| 2,379,396 | 6/1945 | Ziliotto | 55/178 X |
| 2,500,774 | 3/1950 | Sebald | 55/87 X |
| 3,151,061 | 9/1964 | Orr | 73/60.1 X |
| 3,167,413 | 1/1965 | Kiekens et al. | 55/227 X |
| 3,616,610 | 11/1971 | Javorsky et al. | 55/178 |
| 3,739,795 | 6/1973 | Hyde et al. | 55/178 X |
| 3,797,204 | 3/1974 | Cavatassi | 55/227 X |

FOREIGN PATENTS OR APPLICATIONS

| | | | |
|---|---|---|---|
| 405,389 | 2/1934 | United Kingdom | 55/87 |

OTHER PUBLICATIONS

Chemical Engineer's Handbook, 3rd Edition, J. H. Perry, Editor, 1950, McGraw-Hill Book Company, Inc., pp. 364–366.

*Primary Examiner*—Frank W. Lutter
*Assistant Examiner*—David L. Lacey
*Attorney, Agent, or Firm*—Pennie & Edmonds

[57] ABSTRACT

An improved apparatus and method for separating gaseous pollutants and particles from a gas with a foam layer wherein the apparatus includes means for monitoring the foam layer composition and/or height of the foam layer, dispensing means for dispensing a liquid to said foam layer, and means responsive to said monitoring means for activating said dispensing means to control the dispensing of liquid through the dispensing means. The method comprises the steps of monitoring the pressure drop and/or height of the foam layer and dispensing a liquid to the foam layer, when its composition and/or thickness varies beyond a predetermined point, for a time sufficient to bring the composition and/or level of the foam layer back to said predetermined point.

13 Claims, 4 Drawing Figures

FOAM SCRUBBER AND METHOD

BACKGROUND OF THE INVENTION

Apparatus utilizing a foam to absorb gaseous pollutants or filter particulate matter from a gas are well-known. Generally, they comprise a treatment chamber containing a foam layer therein spaced between a dirty gas inlet and a cleaned gas outlet. Such a scrubber is disclosed in U.S. Pat. No. 3,616,610. These devices are used to clean a variety of gases, particularly those issuing from industrial operations.

A critical feature in proper operation of such foam scrubbers is the maintenance of an optimum composition of the foam layer. If the foam layer is either too wet or too dry the proper pressure drop is not obtained and proper scrubbing is not possible. The foam layer density is difficult to control, particularly in the case of synthetic based foaming agents. Such foams tend to constantly dry out and eventually expand and are blown out of the dry treatment chamber by the gas. When the layer has become dry, foam density decreases, the concentration of foaming agent in the layer rises, the pressure drop across the layer falls, and the foam layer begins to uncontrollably expand.

While electrode sensors have been utilized to detect a low foam layer height and addition of fresh foam then made to increase layer height, no satisfactory means or method have been found to control excessive foam layer overexpansion.

SUMMARY OF THE INVENTION

An improved apparatus and method have now been found which can efficiently and automatically control foam layer composition to give an optimum, constant pressure drop.

The present invention comprises an improvement in apparatus for removing gaseous contaminants and particles from a gas with a foam and having a treatment chamber for throughflow of the gas, the chamber having gas inlet and gas outlet means and a foam layer therebetween, the improvement comprising means for dispensing a liquid to said foam layer, means for monitoring the pressure drop and/or height of said foam layer, and means responsive to said monitoring means for activating said dispensing means.

The invention also comprises the method of controlling the composition of a foam layer in apparatus for removing unwanted gases and particles from a gas with a foam comprising the steps of monitoring the pressure drop and/or height of said foam layer and dispensing a liquid to the foam layer when its pressure drop and/or height exceeds a predetermined point, as determined by said monitoring, for a time sufficient to bring the pressure drop and/or height of the foam layer back to said predetermined point.

DETAILED DESCRIPTION

Figure 1:
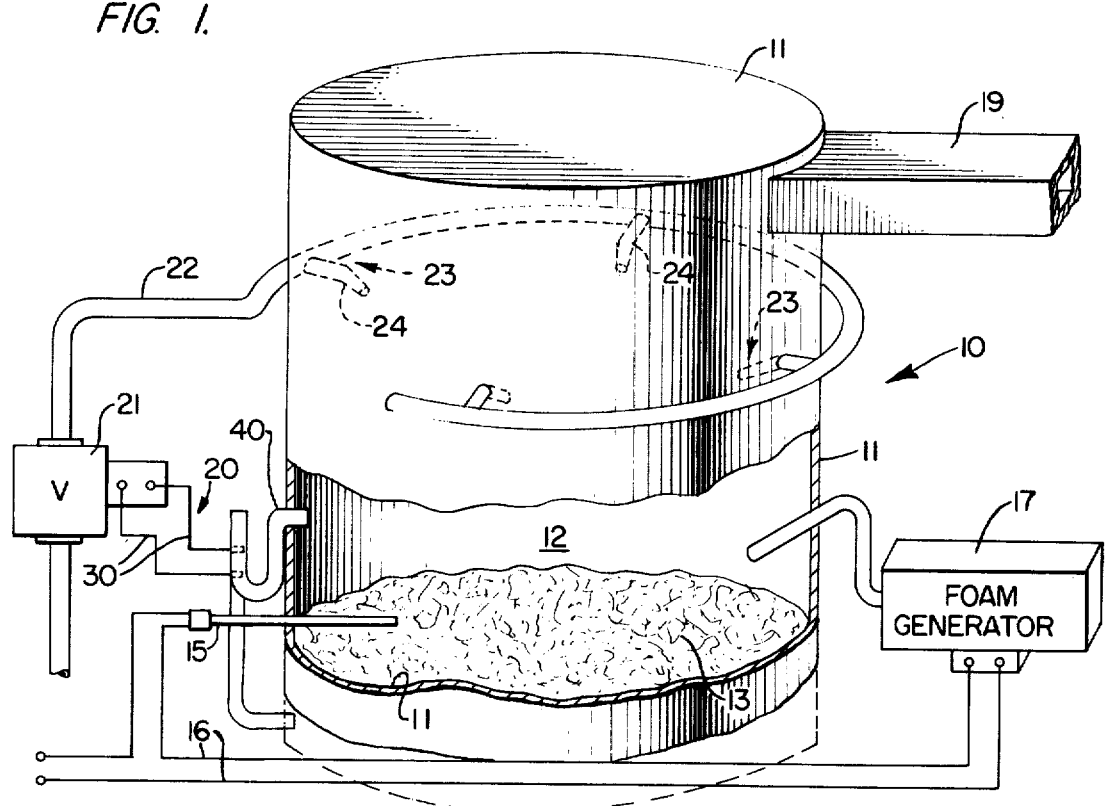
FIG. 1 is a perspective diagrammatic view partially broken away of a foam scrubber embodying the present invention.

Referring to the drawings, there is shown a foam scrubber 10 of the type depicted and described in U.S. Pat. No. 3,616,610.

Scrubber 10 comprises walls 11 defining a treatment chamber 12 with a foam layer 13 supported on a perforated screen 14 that extends across chamber 12. A sensor 15, preferably an electrode extending into layer 13, detects low foam height and is connected by conventional electrical means 16 to a conventional foam generator 17. When electrode 15 senses that foam layer 13 is too low, it generates a signal to foam generator 17 which in turn supplies more foam to layer 13. The foam is formed by dispersing air into a liquid foaming agent, suitable agents and foam-forming procedures used being those known and conventionally practiced in this art.

Figure 4:
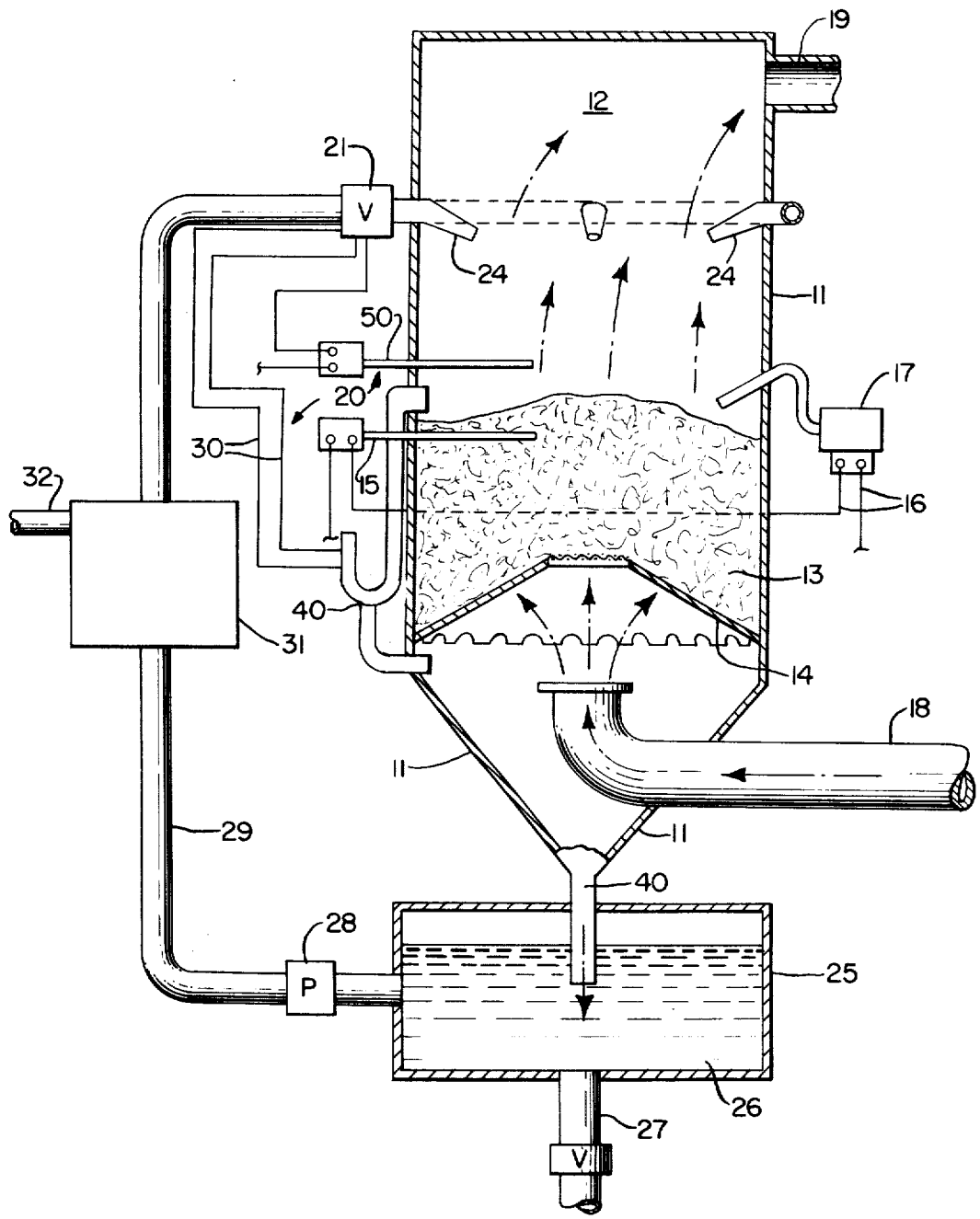
FIG. 4 is a vertical sectional view of another embodiment of the invention.

As best shown in FIG. 4, pipe 18 supplies dirty gas into the lower portion of chamber 12 and the gas rises through layer 13 into the upper portion of chamber 12 and out through duct 19. The foam acts on the dirty gas as it passes through layer 13 to remove the gaseous contaminants and particulate matter from the dirty gas.

Figure 2:
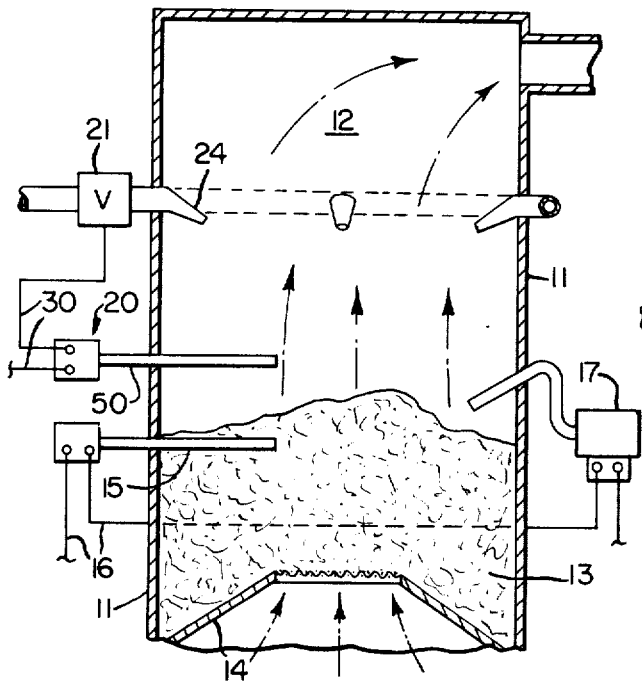
FIG. 2 is a partial vertical sectional view of an alternate embodiment of the invention.
Figure 3:
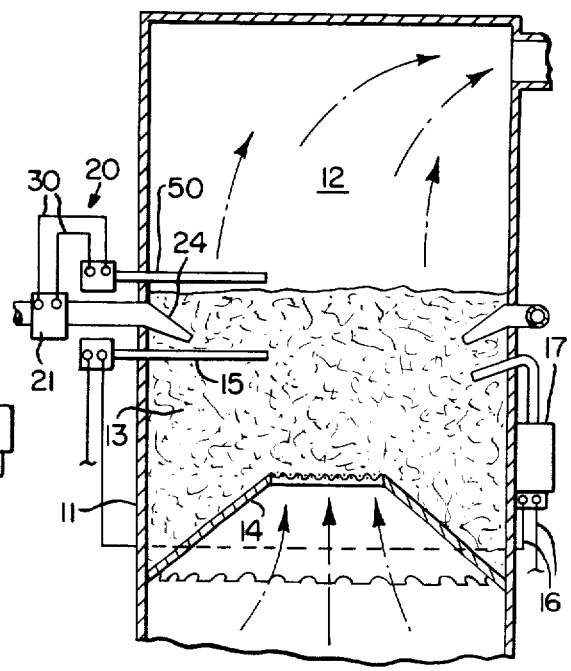
FIG. 3 is a partial vertical sectional view of a further embodiment of the invention.

A second sensor means 20, which can be either a manometer-pressure differential controller including a manometer 40 and associated electrical means 30 for measuring pressure drop across foam layer 13 as shown in FIGS. 1 and 3 or an electrode 50 and an associated electrical means 30 for detecting the height of the layer as shown in FIGS. 2, 3, and 4, is connected to valve 21. Valve 21 is preferably an electrically activated solenoid valve that controls the flow of liquid through conduit 22 to dispensing means 23. Dispensing means 23 comprises, preferably, a plurality of spray nozzles 24 attached to conduit 22 and which are spaced about and extend through wall 11 into chamber 12.

In the embodiments of the invention shown in FIGS. 1 2, and 4, spray nozzles 24 are positioned above foam layer 13 and in FIG. 3 they are positioned to extend into layer 13.

FIG. 4 illustrates an embodiment of the present invention which provides recycling of the liquid and spent foaming agent to the foam layer 13. The waste water and spent foam sludge flow downwardly along walls 11 to liquid outlet 40 into effluent tank 25. The sludge 26 settles to the bottom of tank 25 and can be removed through sump 27. The remaining liquid including the spent foam is pumped by means of pump 28 through pipe 29 to reservoir tank 31. The liquid-spent foam mixture in reservoir tank 31 is then used as the liquid supply to dispensing means 23. In order to prevent the foaming agent concentration from becoming too great in reservoir tank 31, fresh liquid is supplied through pipe 32. If the foaming agent concentration is too great, spraying of the effluent solution to the foam layer 13 will not control an overexpanding layer. It will be noted that FIG. 4 also illustrates an embodiment whereby, in addition to an electrode sensor means 50 being utilized, there is also depicted a manometer 40 connected by electrical means 30 to valve 21.

If desired, reservoir tank 31 can be eliminated and pump 28 controlled by sensor 20 to supply liquid on demand to dispensing means 23. In such case, fresh liquid can be added directly to effluent tank 25.

The recycling offered has several advantages. It minimizes disposal problems, returns foaming agent to foam layer 13 where it can form new foam by layer action, and it greatly lessens the amount of fresh liquid supplied to the apparatus as well as foaming agent.

In carrying out the method of the instant invention, sensor means 20 monitors the height or pressure drop of layer 13, preferably on a continuous basis. When the height of the layer or pressure drop exceeds a predetermined point or level, this will be detected by sensor 20 and a signal will be generated in a conventional manner and transmitted through electrical means 30 to electrically activated solenoid valve 21. The valve will open causing liquid to flow through conduit 22 to spray nozzles 24 where it is then sprayed to foam layer 13. When sufficient liquid has been applied to collapse the foam layer 13 so that its upper level is below the predetermined point, sensor 20 will signal valve 21 and the spraying of liquid will be terminated.

The predetermined point referred to is one selected based on optimum bed performance and will vary dependent upon the particular foam used, its concentration, velocity of dirty gas, and the like operating conditions of the scrubber. The predetermined high level point, or set point, can be readily determined for each set of conditions, by making an initial test run and noting at what height level or pressure drop across the foam layer the foam layer becomes unstable and starts to expand uncontrollably. The set point can be set at a point below such level to make certain that an optimum operative foam layer is always maintained.

The height of the bed can be monitored by an electrode as shown in FIGS. 2, 3, and 4, and the pressure drop of the bed monitored by a manometer as shown in FIGS. 1 and 4.

The liquid preferably sprayed to the foam is water, although any liquid which will collapse the foam can also be used. The water can be sprayed onto the top of foam layer 13 as shown in FIGS. 1, 2, and 4, or sprayed into foam layer 13 below the surface thereof as shown in FIG. 3. Both methods are effective to collapse the foam.

It is preferred to control the bed composition by monitoring of the pressure drop, and it is considered within the scope of the present invention to monitor both the bed height and pressure drop simultaneously to control bed composition. Such simultaneous monitoring can be effected by utilizing both a manometer and an electrode, as previously described, and connecting them by conventional electrical means to electrically activated solenoid valve 21. Valve 21 is only activated when either monitoring means signals that a predetermined pressure drop or height has been exceeded.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. In a foam scrubber apparatus for separating gaseous pollutants and/or particulate matter from a gas with a foam which comprises means defining a treatment chamber having spaced gas inlet and gas outlet means which permits the flow of gas therethrough and a foam layer therebetween for separating gaseous pollutants and/or particulate matter as said gas travels through said layer, the improvement comprising monitoring means for monitoring the thickness and/or pressure drop of said foam layer, dispensing means for dispensing a liquid to said foam layer for at least partially collapsing said foam layer, and control means responsive to said monitoring means for controlling the dispensing of liquid by said dispensing means, said monitoring means comprises a manometer for measuring the pressure drop across said foam layer, said dispensing means comprising at least one spray nozzle positioned in said treatment chamber, and said control means is an electrically activated solenoid valve.

2. The apparatus of claim 1 including means to collect liquid effluent from said treatment chamber and means to convey said liquid effluent from said collection means to said dispensing means for at least partially collapsing the foam layer.

3. The apparatus of claim 1 wherein the at least one spray nozzle is positioned in said treatment chamber above said foam layer.

4. The apparatus of claim 1 wherein the at least one spray nozzle is positioned in said treatment chamber so as to protrude into said foam layer.

5. A method of controlling the height of a foam layer in a foam scrubbing apparatus comprising the steps of monitoring the pressure drop across said foam layer and dispensing a liquid to the foam layer when its thickness exceeds a predetermined point, as determined by said monitoring, for a time sufficient to bring the thickness of said foam layer below said predetermined point.

6. The method of claim 5 wherein said monitoring is continuous during operation of the foam scrubbing apparatus and the dispensing of liquid is automatically controlled in response to the monitoring.

7. The method of claim 5 including the steps of recovering the liquid dispensed to the foam and recycling said recovered liquid to be dispensed again directly to said foam layer for at least partially collapsing the foam layer.

8. The method of claim 7 including the step of removing undesired particulate matter and/or dissolved gaseous contaminants from said recovered liquid before it is recycled for redispensing.

9. In apparatus for separating gaseous pollutants and/or particulate matter from a gas with a foam which comprises means defining a treatment chamber having gas inlet and gas outlet means and a foam layer therebetween, the improvement comprising means for monitoring said foam layer, dispensing means for dispensing a liquid to said foam layer for at least partially collapsing said foam layer to control said foam layer, means responsive to said monitoring means for controlling the dispensing of liquid by said dispensing means, and means to collect liquid effluent from said treatment chamber, and means to convey said liquid effluent from said collection means to said dispensing means for at least partially collapsing said foam layer, said means to convey liquid effluent from said collector means to said dispensing means includes means to prevent too high a concentration of foaming agent in the liquid effluent.

10. In apparatus for separating gaseous pollutants and/or particulate matter from a gas with a foam which comprises means defining a treatment chamber having gas inlet and gas outlet means and a foam layer therebetween, the improvement comprising monitoring means for monitoring the pressure drop of said foam layer, dispensing means for dispensing a liquid to said foam layer so as to at least partially collapse the foam layer, and control means responsive to said monitoring means for controlling the dispensing of liquid by said dispensing means.

11. A method of controlling the height of a foam layer in a foam scrubbing apparatus comprising the steps of monitoring said foam layer, dispensing a liquid to the foam layer when its thickness exceeds a predetermined point, as determined by said monitoring, for a time sufficient to bring the thickness of said foam layer below said predetermined point, recovering the liquid dispensed to the foam and recycling said recovered liquid to be dispensed again to said foam layer, removing undesired particulate matter and/or dissolved gaseous contaminants from said recovered liquid before it is recycled for redispensing to said foam layer for at least partially collapsing the foam layer, and wherein the liquid is water and said foam layer is monitored by measuring the pressure drop across said foam layer.

12. A method of controlling the height of a foam layer in a foam scrubbing apparatus comprising the steps of monitoring the height of said foam layer, dispensing a liquid to the foam layer when its thickness exceeds a predetermined point, as determined by said monitoring, for a time sufficient to bring the thickness of said foam layer below said predetermined point, recovering the liquid dispensed to the foam and recycling said recovered liquid to be dispensed again to said foam layer, and reducing excess concentrations of foaming agent in said recovered liquid for controlling overexpanding of said foam layer.

13. In a foam scrubber apparatus for separating gaseous pollutants and/or particulate matter from a gas with a foam which comprises means defining a treatment chamber having spaced gas inlet and gas outlet means which permits the flow of gas therethrough and a foam layer therebetween for separating gaseous pollutants and/or particulate matter as said gas travels through said layer, the improvement comprising monitoring means for monitoring the thickness and/or pressure drop of said foam layer, dispensing means for dispensing a liquid to said foam layer for at least partially collapsing said foam layer, and control means responsive to said monitoring means for controlling the dispensing of liquid by said dispensing means said monitoring means is comprised of a manometer for measuring the pressure drop across said foam layer.

* * * * *